Patented Jan. 3, 1933

1,892,990

UNITED STATES PATENT OFFICE

FRANZ LINNER, OF VIENNA, AUSTRIA, ASSIGNOR, BY MESNE ASSIGNMENTS, TO BECK, KOLLER & COMPANY, INC., OF DETROIT, MICHIGAN, A CORPORATION OF DELAWARE

PROCESS FOR THE PREPARATION OF ALKYL SUBSTITUTED AROMATIC HYDROXYL COMPOUNDS

No Drawing. Application filed October 16, 1929, Serial No. 400,168, and in Austria June 27, 1929.

This invention relates to a process for the preparation of alkyl substituted aromatic hydroxyl compounds. These substances are chiefly intended to be used as components for the preparation of artificial resins by means of condensation reactions. The invention also includes the preparations of a few alkyl substituted aromatic hydroxyl compounds, which have hitherto not been prepared.

In the literature there are described, essentially three methods for the preparation of alkyl substituted aromatic hydroxyl compounds, thus:—

1. *Liebermann Berichte 44. p. 1842.*—Alcohols, zinc chloride and phenols are heated for a lengthy period under a reflux condenser. The reaction product is rich in unchanged phenol and phenol ethers formed as by-products.

2. *Koenigs Berichte 23. p. 3145.*—Employs amylene and causes it to react with phenolic bodies in glacial acetic acid-sulphuric acid solution. In this case also, phenol ethers are formed in large quantities, as well as polymerized amylenes.

3. *Guretwitsch Berichte 32. p. 2428.*—Causes phenol to react with tertiary butyl chloride or tertiary amyl chloride with the addition of aluminum chloride. The yield is almost theoretical, and by-products are not detected. The employment of tertiary chlorides, which are expensive and difficult to obtain is, however, a great drawback to this process.

The present invention consists in the preparation of substituted aromatic hydroxyl compounds by causing phenols to react with unsaturated hydrocarbons in the presence of aluminium chloride or ferric chloride or zinc chloride, a small quantity of an alkyl halide being introduced into the mixture to initiate the reaction.

According to this invention, therefore, it is possible to replace the alkyl chlorides by unsaturated hydrocarbons. This substitution of the alkyl chloride by unsaturated hydrocarbons is already known from a few Friedel Crafts' reactions (see D. R. P. 184230 for the preparation of alkylated hydrocarbons). It was, however, not to be foreseen that nuclear substituted phenols, etc., would be obtained directly using unsaturated hydrocarbons without previous formation of phenol ethers. Nevertheless the present invention succeeds in directly substituting phenols in the nucleus by employing suitable proportions, in the presence of solvents, or higher temperatures or pressures, without even small quantities of phenol ethers appearing as by-products.

The invention is illustrated by the following examples:—

1. 10 parts of phenol are dissolved in 100 parts of carbon tetrachloride and the mixture is cooled to about −35° C.; 1 part of aluminium chloride or ferric chloride or zinc chloride is then added and ethylene gas passed in until about 3.2 parts by weight, that is, 10% more than that theoretically necessary, has been dissolved. Then 0.4 parts by weight of ethyl chloride is added and the whole gradually heated during 12 hours to 60° C. in an autoclave in order to avoid too great an increase of pressure. The mixture is then decomposed with water and the carbon tetrachloride distilled off; finally it is purified by fractionation. The reaction product distills over between 210° C. and and 220° C. and consists of pure ethyl phenol in a yield of about 72% as needles or small plates.

2. 10 parts of phenol are dissolved in 100 parts of carbon tetrachloride and the mixture cooled to about −20° C.; 1 part of aluminum chloride or ferric chloride or zinc chloride is then added and propylene gas passed in until 4.9 parts of the gas are dissolved corresponding to an excess of 10%. Then 0.5 parts of normal or iso-propyl chloride is added and the whole gradually heated during 10 hours to a temperature of 60° C. to 70° C. in an autoclave. Towards the conclusion of the reaction nitrogen or carbon dioxide can be introduced under pressure and the pressure brought up to 2 to 3 atmospheres in order to increase the yield. The mixture is now decomposed with water and the solvent distilled off. It is then purified by distillation and the reaction product collected between 225° C. and 232° C. It consists of practically pure iso-propyl phenol giving a yield of about 75% in the form of needles of M. Pt. 60° C.

3. 10 parts of phenol are dissolved in 100 parts of carbon tetrachloride and the mixture cooled to −10° C.; 1 part of aluminium chloride, or ferric chloride or zinc chloride is then added and isobutylene gas passed in until about 6.5 parts are dissolved. Then 0.7 parts of normal or iso- or tertiary-butyl chloride is added and the mixture heated during 6 to 8 hours to about 80° C. in an autoclave. Towards the end nitrogen or carbon dioxide is introduced under pressure and the pressure raised by 1 to 2 atmospheres, then after decomposition by water the solvent is distilled off and lastly the reaction product fractionated. It has a B. Pt. of 235–240° C. and M. Pt. of 96–98° C. and consists of large needle-like crystals of p-tertiary butyl phenol in a yield of 80%.

4. 10 parts of phenol are dissolved in 100 parts of carbon tetrachloride and the mixture cooled to 0° C. is then mixed with 1 part of aluminium chloride or ferric chloride or zinc chloride and 8.2 parts of amylene of B. Pt. 25–40° C. added. Then 0.9 parts of amyl chloride—any of the isomers but preferably the tertiary is added and the whole heated to boiling under a reflux condenser during six hours, then decomposed with water, the solvent distilled off and the reaction product purified by distillation. It has a B. Pt. of 245–255° C., M. Pt. of 93–94° C. and consists of large needles of p-tertiary amyl phenol in a yield of 85%.

5. The reaction according to Example 4 can also be carried out without the solvent the phenol being dissolved directly in the amylene whereupon the usual additions are then made.

6. 10 parts of m-cresol are dissolved in 100 parts of carbon tetrachloride 1 part of aluminium chloride or ferric chloride or zinc chloride is added and the mixture cooled to about −20° C., thereafter propylene gas is passed until 4.4 parts corresponding to a 10% excess are absorbed. Then 0.4 parts of normal or iso-propyl chloride is added and the mixture heated during 10 hours in an autoclave to above 70° C. Towards the end of the reaction nitrogen gas can be introduced under pressure. The mixture is then decomposed with water and the solvent distilled off. The greater part of the reaction product distils between 228° C. and 235° C., is liquid, difficultly soluble in concentrated lye and can be identified as 3-methyl-x-iso-propyl phenol. The yield is 69%.

7. 10 parts of o-cresol are dissolved in 50 parts of carbon tetrachloride and the mixture cooled to −10° C.; then 1 part of aluminium chloride or ferric chloride or zinc chloride is added and isobutylene gas passed in until 5.6 parts corresponding to a 10% excess are absorbed. Then 0.5 parts of butyl chloride (any of the isomers) is added and the mixture warmed in an autoclave during 6 to 8 hours to about 80° C., decomposed with water and the solvent distilled off; the greater part of the product distils at 245° C.–250° C. and is recognized as 2-methyl-x-tertiary butyl phenol, a liquid, difficulty soluble in concentrated lye, giving a yield of 73%.

8. 10 parts of p-cresol are mixed with 7.1 parts of amylene at 0° C.; 50 to 100 parts of carbon tetrachloride may be added although this is not absolutely necessary, then 1 part of aluminium chloride or ferric chloride or zinc chloride is added, then 0.7 parts of amyl chloride (any of the isomers) is added and the mixture heated to boiling under a reflux condenser. Then worked up as usual. The product is recognized as 4-methyl-x-tertiary amyl phenol, giving a yield of 78%. It is slightly soluble in concentrated lye.

9. 10 parts of β naphthol are dissolved in 100 parts of carbon tetrachloride with the addition of 1 part of aluminium chloride or ferric chloride or zinc chloride and the mixture cooled to −20° C., isobutylene gas is then passed in until 4.4 parts corresponding to a 10% excess are dissolved, then 0.4 parts of butyl chloride (one of the isomers) is added the mixture is then heated during 6 to 8 hours to about 80° C., and thereafter decomposed with water, the solvent distilled off and the residue crystallized from alcohol and benzene as small white plates, fairly soluble in lye. The product has a M. Pt. 155–160° C. and is recognized as mono-tertiary-butyl-β-naphthol. Yield of the pure product is 50%.

10. 10 parts of phenol are mixed with 8.2 parts of amylene and 1.5 parts of aluminium bromide, with or without the addition of 50 to 100 parts of carbon tetrachloride. Then 1 part of amyl bromide (one of the isomers) is added and the mixture warmed slowly under a reflux condenser to about 60° C.; after about 5 hours it is decomposed with water, the solvent, if present, is removed and the product distilled; it is p-tertiary amyl phenol of M. Pt. 93–94° C., B. Pt. 245–255° C. The yield is 87–90%.

11. 10 parts of phenol are dissolved in 100 parts of carbon tetrachloride and the mixture cooled to −35° C.; then 1.5 parts of aluminium bromide or zinc bromide are added (ferric bromide is unsuitable, giving side reactions) and ethylene is passed in until 3.2 parts are dissolved. Then 0.3 parts ethyl bromide is added and the whole slowly heated to about 60° C. in an autoclave during about 13 hours. It is then decomposed with water and the solvent removed. The product distills at 210–220° C. and is pure ethyl phenol. The yield is about 68% in the form of needles or small plates.

12. 10 parts of o-cresol are dissolved in 100 parts of carbon tetrachloride and the mixture cooled to −20° C., then 1.5 parts of aluminium bromide or zinc bromide are added and the mixture allowed to absorb 4.4 parts of propylene. Then 0.4 propyl bromide (normal or iso) is added. The mixture is warmed in an autoclave to about 70° C. during 10 hours and worked up as usual. The product is 2-methyl-x-isopropyl phenol, a liquid of B. Pt. 230–235° C. difficultly soluble in lye. The yield is 73%.

13. 10 parts m-cresol are dissolved in 100 parts of carbon tetrachloride and 1.5 parts of aluminium bromide or zinc bromide are added, cooled to −10° C. and allowed to absorb 5–6 parts of isobutylene gas. Then 0.5 butyl bromide (one of the isomers) is added, the mixture warmed in an autoclave to 80° C. during about 6 hours and worked up as usual. The product is 3-methyl-x-tertiary-butyl phenol, a liquid of B. Pt. 222–226° C., difficultly soluble in lye. Yield 74%.

What I claim is:—

1. A process for the production of alkyl substituted aromatic hydroxyl compounds which consists in causing aromatic hydroxyl compounds to react with unsaturated hydrocarbons of the olefine series in the presence of aluminium chloride, zinc chloride, ferric chloride and similar metal chlorides acting as condensing agents and of a small quantity of a halogen compound of the type $C_nH_{2n+1}X$ where X is chlorine or bromine in addition to the metal chloride and where $n$ may have any value from one upwards, for initiating the reaction.

2. A process as claimed in claim 1, wherein the halogen compound is an alkyl halogen compound.

3. A process as claimed in claim 1, wherein the halogen compound is an alkyl chloride.

4. A process as claimed in claim 1, wherein the halogen compound is ethyl chloride.

5. A new compound comprising as dominant components a benzene nucleus with a hydroxyl group, a methyl group and an aliphatic $C_5H_{11}$ group each joined to said nucleus.

6. A new compound comprising as dominant components a benzene nucleus with a hydroxyl group, a methyl group and a tertiary amyl group each joined to said nucleus.

7. A process for the production of alkyl-substituted aromatic hydroxyl compounds, which consists in causing aromatic hydroxyl compounds to react with unsaturated hydrocarbons of the olefine series in the presence of a metal chloride condensing agent to which is added a small quantity of a halogen compound of the type $C_nH_{2n+1}X$, whede X is chlorine or bromine and $n$ may have any value from one upward, for initiating the reaction.

8. A process as set forth in claim 7, wherein the metal chloride condensing agent is selected from a group consisting of aluminium chloride, zinc chloride and ferric chloride.

In testimony whereof I affix my signature.

FRANZ LINNER.